(12) United States Patent
Kugler et al.

(10) Patent No.: US 11,515,601 B2
(45) Date of Patent: Nov. 29, 2022

(54) BATTERY SEPARATOR

(71) Applicant: Sumitomo Chemical Company Limited, Tokyo (JP)

(72) Inventors: Thomas Kugler, Cambridge (GB); Melanie O'Sullivan, Godmanchester (GB); Luisa Petti, Cambridge (GB)

(73) Assignee: Sumitomo Chemical Company Limited, Tokyo (JP)

( * ) Notice: Subject to any disclaimer, the term of this patent is extended or adjusted under 35 U.S.C. 154(b) by 321 days.

(21) Appl. No.: 16/652,006

(22) PCT Filed: Sep. 12, 2018

(86) PCT No.: PCT/GB2018/052591
§ 371 (c)(1),
(2) Date: Mar. 27, 2020

(87) PCT Pub. No.: WO2019/063969
PCT Pub. Date: Apr. 4, 2019

(65) Prior Publication Data
US 2020/0274123 A1 Aug. 27, 2020

(30) Foreign Application Priority Data
Sep. 29, 2017 (GB) ..................... 1715861

(51) Int. Cl.
*H01M 10/0565* (2010.01)
*H01M 4/60* (2006.01)
(Continued)

(52) U.S. Cl.
CPC ........... *H01M 50/44* (2021.01); *H01M 4/602* (2013.01); *H01M 10/0525* (2013.01);
(Continued)

(58) Field of Classification Search
None
See application file for complete search history.

(56) References Cited

U.S. PATENT DOCUMENTS

| | | | |
|---|---|---|---|
| 5,102,752 A | 4/1992 | Hope et al. | |
| 2015/0188108 A1* | 7/2015 | Miyazawa | H01M 50/449 156/60 |

(Continued)

FOREIGN PATENT DOCUMENTS

| | | | |
|---|---|---|---|
| CN | 104393336 | * | 3/2015 |
| RU | 2503098 C1 | | 12/2013 |

OTHER PUBLICATIONS

CN 104393336 English translation. Li et al. China. Mar. 4, 2015 (Year: 2015).*

(Continued)

*Primary Examiner* — Christopher P Domone
(74) *Attorney, Agent, or Firm* — Wolf, Greenfield & Sacks, P.C.

(57) ABSTRACT

A separator for a battery formed from a polymer gel electrolyte that is disposed within the pores of a polymer mesh. The polymer gel electrolyte is formed from a crosslinked ion-conducting polymer and an ionic liquid. The separator is formed from a gel loaded with an electrolyte, which prevents issue with electrolyte leakage. The polymer mesh provides stability to the polymer gel electrolyte, allowing for use of thin films of the polymer gel electrolyte and use of soft polymer gel electrolytes.

13 Claims, 7 Drawing Sheets

(51) Int. Cl.
$H01M$ $10/0525$ (2010.01)
$H01M$ $10/0585$ (2010.01)
$H01M$ $50/44$ (2021.01)
$H01M$ $50/411$ (2021.01)
$H01M$ $50/403$ (2021.01)

(52) U.S. Cl.
CPC ... $H01M$ $10/0565$ (2013.01); $H01M$ $10/0585$ (2013.01); $H01M$ $50/403$ (2021.01); $H01M$ $50/411$ (2021.01); $H01M$ $2300/0085$ (2013.01)

(56) References Cited

U.S. PATENT DOCUMENTS

| | | | | |
|---|---|---|---|---|
| 2015/0333331 | A1* | 11/2015 | Johnson | H01M 4/608 526/256 |
| 2017/0133720 | A1* | 5/2017 | Kim | H01M 50/411 |
| 2017/0273435 | A1* | 9/2017 | Megaro | A45D 34/041 |

OTHER PUBLICATIONS

Combined Search and Examination Report for Application No. GB 1715861.9 dated Mar. 9, 2018.

International Search Report and Written Opinion for International Application No. PCT/GB2018/052591 dated Jan. 17, 2019.

Kimura et al., Ionic Liquid-Containing Composite Poly(ethylene oxide) Electrolyte Reinforced by Electrospun Silica Nanofiber. Journal of the Electrochemical Society. 2017;164(13):A3357-A3361. doi: 10.1149/2.1691713jes.

Liang et al., Heavily n-Dopable π-Conjugated Redox Polymers with Ultrafast Energy Storage Capability. Journal of the American Chemical Society. 2015;137(15):4956-4959. doi: 10.1021/jacs.5b02290.

Zhong et al., Cross-linking of polymer and ionic liquid as high-performance gel electrolyte for flexible solid-state supercapacitors. Electrochimica Acta. 2017;244:112-118. doi: 10.1016/j.electacta.2017.05.110.

* cited by examiner

BATTERY SEPARATOR

RELATED APPLICATIONS

This Application is a national stage filing under 35 U.S.C. § 371 of international PCT application no. PCT/GB2018/052591, filed Sep. 12, 2018, which claims priority to United Kingdom patent application no. GB 1715861.9, filed Sep. 29, 2017, each of which is incorporated herein by reference in its entirety.

BACKGROUND

Embodiments of the present disclosure relate to separators for use in batteries and methods of forming said separators, and more particularly, but not by way of limitation, to separators for polymer batteries.

Electrochemical devices comprising mobile ions that move between two electrodes, include battery cells, such as lithium ion battery cells and polymer-based battery cells.

Porcarelli et al., "Super Soft All-Ethylene Oxide Polymer Electrolyte for Safe All-Solid Lithium Batteries", SCIENTIFIC REPORTS, 6, 19892 (2016) discloses a crosslinked polyethylene oxide (PEO) polymer electrolyte plasticized by tetraglyme and obtained by UV-induced (co)polymerization which promotes an effective interlinking between the PEO chains.

A conducting polymer may be provided as an active material in the anode or cathode of a polymer-based battery cell, for example as described in: JOURNAL OF POWER SOURCES, Volume 177, Issue 1, Pages 199-204 (15 Feb. 2008); CHEM. REV., 116, 9438-9484 (2016); and CHEMICAL REVIEWS, Vol. 97, No. 1 209 (1997).

GB patent no. 2098636 discloses a macroporous separator for cells, such as nickel-cadmium cells.

KR patent no. 1613766 discloses a porous scaffold of a non-woven fabric.

CN 103022557 discloses a gel polymer electrolyte based on non-woven fabrics for a lithium ion battery.

U.S. patent publication no. 20150044574 discloses an electrolyte membrane including a polymer layer and platelet particles, where the polymer layer is reinforced with a fiber mat and the polymer layer retains an electrolyte.

U.S. Pat. No. 5,665,265 discloses a polymer gel electrolyte support structure.

SUMMARY

The present inventors have found that use of an ionic liquid as the electrolyte in a composite battery separator provides good cycling lifetime. In some embodiments, a gel is formed with/contains the ionic liquid, which ionic liquid may for example be disposed/loaded in the gel, and the gel is provided in the pores of a polymer/nylon mesh to form a battery separator. The gel comprising the ionic liquid may be referred to herein as a polymer gel electrolyte and/or a composite gel electrolyte.

The polymer/nylon mesh confers structural stability to the gel comprising the ionic liquid, meaning that soft, conductive gels and/or thin gel films can be used in the separator, while maintaining a robustness of the separator for, among other things, ease of mechanical handling. In some embodiments of the present disclosure, the mesh provides for use of thin films of the gel and this thin film of gel reduces impedance to ionic flow through the gel. The composite gel electrolytes according to some embodiments of the present disclosure may have high ionic conductivities of up to about 0.46 mS/cm, require no addition of liquid electrolyte during device assembly, and/or with annealing form a strong adhesive interface with the battery redox material.

Accordingly, in a first aspect, some embodiments of the present disclosure provide a battery separator comprising a polymer mesh having mesh pores and a gel in the mesh pores, wherein the gel comprises a crosslinked ion-conducting polymer and an ionic liquid.

According to a second aspect, some embodiments of the present disclosure provide a battery separator according to the first aspect formed by introducing the ion-conducting polymer into the mesh pores and crosslinking the ion-conducting polymer.

In a third aspect, some embodiments of the present disclosure provide a battery cell comprising an anode including an n-type polymer, a cathode including a p-type polymer and a separator according to the first aspect that is positioned between the anode and the cathode.

The present inventors have found that battery cells with a composite separator containing a polymer mesh, in accordance with embodiments of the present disclosure, may be made fabricated by a lamination process. Moreover, because no ionic liquid is used in such fabrication there is no issue with ionic liquid leakage.

In a fourth aspect, some embodiments of the present disclosure provide a method of forming a battery cell from a separator, in accordance with some embodiments of the present disclosure, comprising a polymeric mesh and a crosslinked ion-conducting polymer located in mesh pores of the polymeric mesh, wherein an electrolyte is absorbed in the crosslinked ion-conducting polymer. In the method, the separator is placed between the anode and cathode of the battery cell and the anode and the cathode are pressed together.

DESCRIPTION OF THE DRAWINGS

Embodiments of the present disclosure will now be described in more detail with reference to the drawings in which.

DETAILED DESCRIPTION

Figure 1:
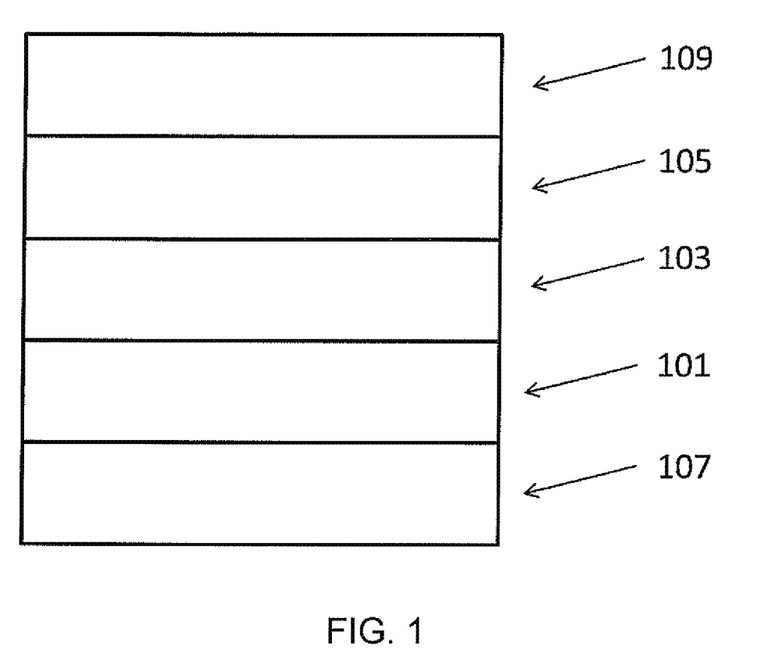
FIG. 1 is a schematic illustration of a conjugated polymer battery.

FIG. 1 illustrates a battery cell 100 comprising an anode 101 comprising an active polymer, a cathode 105 comprising an active polymer, a composite separator 103 between the anode and the cathode, an anode current collector 107 in contact with the anode and a cathode current collector 109 in contact with the cathode.

The composite separator comprises a polymeric mesh having a mesh structure defining pores therein. At least some pores comprise/contain an ion-conducting crosslinked polymer therein. The crosslinked polymer comprises an electrolyte absorbed therein.

In some embodiments, the polymeric mesh is nylon. In some embodiments, the polymeric mesh is woven.

In some embodiments, the pores have an average area of less than about 200 microns, more preferably less than 100 microns or less than 50 microns. In some embodiments, the pores have an average area of at least 5 microns. In some embodiments, the crosslinked polymer fills substantially all of the pore area of the pores.

In some embodiments, the crosslinked polymer is a hydrophilic polymer. The crosslinked polymer may, in some embodiments, comprises polar groups. In some embodiments, the crosslinked polymer is a $C_{2-5}$ alkylene oxide polymer. In some embodiments, the crosslinked polymer comprises or consists of crosslinked poly(ethylene oxide) (PEO). In some embodiments, an alkylene oxide polymer, such as PEO, is used in combination with a nylon polymeric mesh.

The crosslinked polymer may be a mixture of more than one polymer, optionally a mixture of two or more ion-conducting polymers of differing only in molecular weights, optionally two or more PEO polymers of differing molecular weights.

The or each ion-conducting polymer may have a weight average molecular weight (Mw), before crosslinking, in the range of $5 \times 10^3$ to $1 \times 10^8$ or $1 \times 10^4$ or $1 \times 10^5$ to $1 \times 10^7$ Dalton (Da).

In some embodiments, the electrolyte may be a dissolved salt or an ionic liquid. The electrolyte may be a solution of a salt having an organic or metal cation, for example lithium bis(trifluoromethylsulfonyl)imide (LiTFSI) or lithium hexafluorophosphate, in an organic solvent, optionally propylene carbonate.

In some embodiments, the electrolyte is an ionic liquid. According to some embodiments of the present disclosure, the ionic liquid is the only ionic material of the separator.

The ionic liquid may comprise ionic compounds that are liquid at below 100° C. and at 1 atm pressure. Examples include, without limitation, compounds with an ammonium-, imidazolium-, phosphonium-, pyridinium-, pyrrolidinium- or sulfonium cation. The ionic liquid may have a sulfonimide anion, for example bis(trifluoromethane)sulfonimide (TFSI) ionic liquids such as e.g. 1-ethyl-3-methyl imidazolium bis(trifluoromethane)sulfonimide (EMI-TFSI), triethylmethoxyethyl phosphonium bis(trifluoromethane) sulfonimide (TEMEP-TFSI), triethyl sulfonium bis(trifluoromethane)sulfonimide (TES-TFSI) or 1-butyl-1-methylpyrrolidinium bis(trifluoromethane)sulfonimide (BMP-TFSI).

In some embodiments, the material in the pores may consist of the crosslinked polymer and the electrolyte, or may comprise one or more further materials. In some embodiments, the crosslinked polymer may be mixed with a plasticiser, for example a glyme. In some embodiments, the plasticiser may comprise Tetraglyme.

According to some embodiments of the present disclosure, a separator, as described herein, may be formed by introducing an ion-conducting polymer, for example PEO, into the pores of a polymer mesh followed by crosslinking of the polymer. In some embodiments, the ion-conducting polymer may be introduced into the pores of the polymer mesh when in a molten state or in a solution. In some embodiments, the ion-conducting polymer may have a melting point of less than less than 200° C. or less than 150° C.

The polymer mesh may be pressed into the molten ion-conducting polymer in order to introduce the ion-conducting polymer into the pores. The ion-conducting polymer may be heated, for example at a temperature of 80° C. or more, to maintain the ion-conducting polymer in a molten state during pressing. In some embodiments, a solution comprising the ion-conducting polymer and electrolyte may be applied to the polymer mesh followed by evaporation of the solvent or solvents of the solution.

The ion-conducting polymer and polymer mesh may be pressed by a roller, optionally by passing the ion-conducting polymer and polymer mesh through two rollers having a gap therebetween. The gap between the rollers may be selected according to the desired thickness of the separator. The or each roller may be heated.

In some embodiments of the present disclosure, the ion-conducting polymer may be crosslinked following its introduction into the pores of the polymer mesh. Any suitable crosslinking method may be used including, without limitation, heating and/or ultraviolet (UV) irradiation of the ion-conducting polymer.

In some embodiments, the crosslinked polymer may comprise covalent bonds between chains of the ion-conducting polymer and/or, if present, a plasticiser. The crosslinked polymer may comprise non-covalent bonds, optionally hydrogen bonds, between chains of the ion-conducting polymer. In some embodiments, the crosslinking results in formation of non-covalent bonds only between polymer chains.

The polymer chains of the ion-conducting polymer may comprise groups capable of reacting to crosslink the polymer chains. The ion-conducting polymer may be mixed with a crosslinking agent, for example a benzophenone, optionally 4-methylbenzophenone.

The ion-conducting polymer may be the only material introduced into the pores of the polymer mesh, or it may be a mixture of two or more materials. In some embodiments, a mixture comprising or consisting of the ion-conducting polymer and a liquid at 25° C., for example an ionic liquid, a solution of an electrolyte and/or a plasticiser, is introduced into the pores. In some embodiments, the ion-conducting polymer and the liquid form a gel upon crosslinking of the ion-conducting polymer.

In some embodiments, the electrolyte may be provided in the range of about 0.1 mL/g of polymer to 5 mL/g of polymer. The use of the mesh may provide the composite separator with greater mechanical stability than a separator film consisting an electrolyte absorbed in an ion-conducting polymer. This greater stability may allow a greater volume per unit weight of the polymer to be provided in the composite separator. Moreover, in accordance with some embodiments of the present disclosure, the mesh may allow for thin films of the ion-conducting polymer and/or ion-conducting polymer mixture to be used, which may provide for high conductivity. In accordance with some embodiments of the present disclosure, the mesh may allow for soft ion-conducting polymers and/or ion-conducting polymer mixtures to be used.

A protective film may be provided on one or both sides of the ion-conducting polymer and polymer mesh, while they are being pressed together to form the separator, in accordance with some embodiments of the present disclosure. The protective film may be removed before or after crosslinking of the ion-conducting polymer.

In some embodiments, the separator has a thickness of no more than 200 microns, or no more than 100 microns. In some embodiments, the separator has a thickness of at least 10 microns. The crosslinked polymer may extend through at least some or all of the thickness of the polymeric mesh.

To form a battery cell, one surface of the separator is brought into contact with an anode and an opposing surface of the separator is brought into contact with a cathode. In some embodiments of the present disclosure, the ion-conducting polymer does not contain an electrolyte when it is introduced into the pores, and the electrolyte is absorbed into the separator following formation of the composite of the mesh containing ion-conducting polymer in the pores thereof. In some embodiments, the electrolyte is absorbed into the composite before the separator is brought into contact with the anode or cathode of the battery.

In the battery cell, the anode and cathode are each in electrical contact with and/or adjacent to, a respective anode and cathode current collector. To manufacture/form the battery cell, in some embodiments, the anode, cathode and separator may be pressed together, to improve adhesion between the separator and one or both of the anode and the cathode.

The present inventors have found that use of an ionic liquid in a composite separator as described herein may result in the composite separator being particularly sticky as compared to the case where the electrolyte is an ionic compound dissolved in a solvent. This stickiness may be advantageous in improving adhesion of the separator to the anode and/or cathode during device manufacture and/or avoiding delamination of the separator from the anode and/or cathode during flexing in the case where the battery is flexible.

In some embodiments, at least one of the anode and cathode comprise a liquid electrolyte absorbed therein when brought into contact with the separator. The anode and cathode current collectors each independently comprise or consist of a layer of conductive material, for example a metal such as copper or aluminium; a conductive organic polymer such as poly(ethylene dioxythiophene) or polyaniline; or an inorganic conductive compound such as a conductive metal oxide, for example indium tin oxide. Each current collector may be supported on a suitable substrate, for example a glass or plastic substrate.

Active polymers for use in the anode or cathode of a polymer battery may comprise repeat units as disclosed in Chem. Rev. 2016, 116, 9438-9484 and Chemical Reviews, 1997, Vol. 97, No. 1 209, the contents of which are incorporated herein by reference.

A polymer that is capable of undergoing reversible n-doping (an "n-type" polymer) may be used in the anode of a polymer battery cell. n-type polymers as described herein may, in some embodiments, have a LUMO level measured by square wave voltammetry of between −4.5 and −1.5 eV or between −3.5 and −2.0 eV.

A polymer capable of undergoing reversible p-doping (a "p-type" polymer) may be used in the cathode of a polymer battery cell. p-type polymers as described herein may, in some embodiments, have a HOMO level measured by square wave voltammetry of between −4.5 and −6.5 eV or between −4.8 and −6 eV.

The active polymer may be a conjugated polymer. A "conjugated polymer," as used herein, means a polymer comprising repeat units in the polymer backbone that are directly conjugated to adjacent repeat units in the polymer backbone. There may be no breaks in conjugation along the polymer backbone, or conjugation along the backbone may be broken by non-conjugating repeat units within or between repeating units of the conjugated polymer. In some embodiments, conjugated polymers as described herein may comprise monocyclic or polycyclic aromatic or heteroaromatic groups conjugated together in the polymer backbone.

The active polymer may be a non-conjugated polymer. A non-conjugated polymer, as described herein, is free of any $sp^2$ hybridised carbon atoms in the polymer backbone. An active non-conjugated polymer may comprise conjugated groups pendant from the non-conjugated backbone. In some embodiments, the active polymer may be ionic or non-ionic in its undoped state.

In some embodiments, the active polymer of the anode and/or cathode may comprise one or more $C_{6-20}$ aromatic repeat units including, without limitation, phenylene, naphthalene, anthracene, fluorene, acenaphthene and phenanthrene repeat units, each of which may be unsubstituted or substituted with one or more substituents.

A fluorene repeat unit may have formula (I):

(I)

wherein $R^3$ in each occurrence is the same or different and is a substituent; $R^4$ in each occurrence is the same or different; $R^6$ in each occurrence is the same or different; and is H or a substituent.

In some embodiments, each $R^3$ is independently selected from the group consisting of:

$C_{1-20}$ alkyl wherein one or more non-adjacent, non-terminal carbon atoms may be replaced with O, S, —Si($R^9$)$_2$— C=O or COO wherein $R^9$ in each occurrence is independently a substituent; and a group of formula —(Ar$^4$)$_n$ wherein Ar$^4$ in each occurrence is an aryl or heteroaryl group which is unsubstituted or substituted with one or more substituents and n is at least 1.

In some embodiments, Ar$^4$ may comprise phenyl. Substituents of Ar$^4$, if present, may be selected from $C_{1-20}$ alkyl, wherein one or more non-adjacent, non-terminal carbon atoms may be replaced with S, —Si($R^9$)$_2$— C=O or COO; $C_{1-20}$ alkoxy; and an oligo- or polyether group.

In some embodiments, R3 comprises at least two ether groups and is more preferably a group of formula —(OCH$_2$CH$_2$)n-H wherein n is at least 2, optionally 2-10. n is preferably 1, 2 or 3.

A substituent $R^4$ or $R^6$, if present, may be a $C_{1-20}$ alkyl wherein one or more non-adjacent, non-terminal carbon atoms may be replaced with S, —Si($R^9$)$_2$— C=O or COO wherein $R^9$ in each occurrence is independently a substituent. Preferably, each $R^4$ is H. Preferably, each $R^6$ is H.

By "non-terminal carbon atom" of an alkyl chain as used herein is meant a carbon atom other than the carbon atom of a methyl group of an n-alkyl chain, or carbon atoms of a methyl group of a branched alkyl chain.

The active polymer of the anode may comprise one or more heteroarylene repeat units, more preferably a repeat unit of formula (II):

(II)

wherein $R^5$ in each occurrence is the same or different and is H or a substituent.

In some embodiments, each $R^5$ is independently selected from H, $C_{1-20}$ alkyl and phenyl which is unsubstituted or substituted with one or more $C_{1-12}$ alkyl groups.

The active polymer of the anode may comprise an amine repeat unit comprising a N atom in the polymer backbone, optionally a repeat unit of formula (III) or (IV):

wherein $R_{11}$ to $R_{19}$ are independently selected from hydrogen, $C_{1-20}$-alkyl, $C_{1-20}$-alkyl ether, $C_{1-20}$-carboxyl, $C_{1-20}$-carbonyl, $C_{1-20}$-ester, $C_{6-18}$-aryl, $C_{5-18}$-heteroaryl; n is greater than or equal to 1 and preferably 1 or 2; and $Z_3$ is selected from a single bond, $C_{1-20}$-alkylene, optionally substituted $C_{6-18}$-arylene, or an optionally substituted $C_{5-18}$-heteroarylene group.

In some embodiments, $R_{12}$ to $R_{19}$ are independently selected from hydrogen, $C_{1-12}$-alkyl, $C_{1-12}$-alkyl ether, $C_{1-12}$-carboxyl, $C_{1-12}$-carbonyl, $C_{1-12}$-ester, optionally substituted $C_{6-12}$-aryl, and optionally substituted $C_{5-12}$-heteroaryl groups; $Z_3$ is selected from a single bond, an optionally substituted $C_{1-12}$-alkylene, optionally substituted $C_{1-12}$-oxyalkylene, optionally substituted $C_{6-12}$-arylene, or an optionally substituted $C_{6-12}$-heteroarylene group. In one embodiment, $Z_3$ is an optionally substituted phenylene group, with the residue $R_{11}$ being preferably an oligo- or polyether group having at least two alkoxy repeat units and being located in m- or p-position relative to the arylamino group.

In some embodiments, at least one of the anode and cathode comprise one or more conductive carbon materials. Conductive carbon materials may be selected from, without limitation, one or more of the group consisting of carbon black, carbon fiber, graphite, and carbon nanotubes. In some embodiments, the BET specific surface area of the conductive carbon material is in the range of 10 m²/g to 3000 m²/g.

EXAMPLES

Measurements

Square wave voltammetry measurements as described herein are performed using a CHI660D Electrochemical workstation with software (IJ Cambria Scientific Ltd)), a CHI 104 3 mm glassy carbon disk working electrode (IJ Cambria Scientific Ltd)); a platinum wire auxiliary electrode; an Ag/AgCl reference electrode (Harvard Apparatus Ltd); acetonitrile as cell solution solvent (Hi-dry anhydrous grade-ROMIL); toluene as sample preparation solvent (Hi-dry anhydrous grade); ferrocene as reference standard (FLUKA); and tetrabutylammoniumhexafluorophosphate (FLUKA) as cell solution salt. For sample preparation, the polymer is spun as thin film (~20 nm) onto the working electrode and the dopant material is measured as a dilute solution (0.3 wt %) in toluene. The measurement cell contains the electrolyte, a glassy carbon working electrode onto which the sample is coated as a thin film, a platinum counter electrode, and a Ag/AgCl reference glass electrode. Ferrocene is added into the cell at the end of the experiment as reference material (LUMO (ferrocene)=−4.8 eV).

Separator impedance was measured by electrochemical impedance spectroscopy (EIS) by sandwiching the separator between two 1×1 inch plates of aluminium on glass secured on the separator by clips The devices were placed into a sealed container under an inert atmosphere and connected to a potentiostat (CHI660D Electrochemical workstation with software (IJ Cambria Scientific Ltd)). The following parameters were used:

High frequency (Hz): 2,000,000

Low frequency (Hz): 0.1

AC voltage amplitude (V): 0.01 at the open circuit voltage (OCV)

Quiet time (s): 2

EIS data of gel electrolytes was analysed by fitting the results to the equivalent electrical circuit model, which typically consists of solution resistance $R_S$ (accounting mainly for the ionic resistance through the gel electrolyte) in series with a non-ideal double-layer capacitor $C_{DL}$ (accounting for the double layer formation between each electrode/gel electrolyte interface).

The ionic conductivity σ through the gel electrolyte was calculated using the following equation:

$$\sigma = \frac{l}{R_S \cdot A}$$

where, l is the thickness of the gel electrolyte and A the contact area of the gel electrolyte with the aluminium electrode.

Batteries as described in the examples were tested by placing into a sealed container under an inert atmosphere and connecting to a potentiostat (CHI660D Electrochemical workstation with software (IJ Cambria Scientific Ltd)). The following parameters were used:

Cathodic current 1 mA/cm$^2$ (discharge current)
Anodic current 1 mA/cm$^2$ (charging current)
Charging potential: 3 V
High potential hold time: 60 s
Active area: 1.5 cm$^2$
Charge-discharge sequence 10 times.

Mid-point voltage and real capacity were calculated for each cycle.

Galvanostatic charging was at 1 mA/cm$^2$ followed by a 60 s potentostatic hold at 3V and galvanostatically discharged at 1 mA/cm$^2$.

Separator Example 1

0.25 g of PEO (20 k) available from Sigma-Aldrich, CAS number 9004-74-4, 1.0 mL of tetraethylene glycol dimethyl ether (tetraglyme) available from Sigma-Aldrich and 0.21 g of 4-Methylbenzophenone (MBP) were mixed in a pestle and mortar at 120° C. until the PEO (20 k) fully melted and a viscous liquid formed.

0.75 g of PEO (100 k) available from Sigma-Aldrich, CAS number 25322-68-3, was added and the mixture was stirred until PEO (100 k) fully melted and highly viscous paste formed, having a PEO (100 k):PEO (20 k):tetraglyme: MBP weight ratio of 3:1:4:0.8.

The molten polymer mix was deposited in a roughly 6 cm diameter circle on the back side of a 50 µm thick sheet of PET.

A 47 mm diameter hydrophilic nylon net filter with a 41.0 µm pore size available from Merck Millipore (part number NY4104700) was placed on top of the deposited molten polymer mixture. Another sheet of PET was placed on top of the nylon mesh.

The PET-polymer-nylon-PET sandwich was pressed between two hot plates heated to 120° C. and then laminated at 100° C. to form a thin film of PEO evenly distributed in the pores of the nylon mesh.

Without removing the PET sheets, the polymer mixture was cured using UV light (250 W UVH 255 hand lamp with an iron-doped metal halide lamp, intensity >80 mW cm$^{-2}$) for 6 minutes either side under an inert, dry atmosphere.

The resulting gel/nylon composite separator was cut to size (e.g. a 3×1.5 cm rectangle) and then peeled off the PET substrate to give a film having a thickness of between 40-65 µm.

The composite was soaked in BMP-TFSI liquid electrolyte overnight, and excess liquid electrolyte was removed by blotting with filter paper.

Separator Example 2

A separator was prepared as described for Separator Example 1 except that nylon mesh having a 180 micron pore size was used.

Separator Example 3

A separator was prepared as described for Separator Example 1 except that PEO (20K) was the only PEO used.

Separator Example 4

A separator was prepared as described for Separator Example 1 except that PEO (100K) was the only PEO used.

Separator Example 5

A separator was prepared as described for Separator Example 1 except that Li-TFSI was used in place of BMP-TFSI.

Comparative Separator 1

For the purpose of comparison, a separator was formed as described in Separator Example 1 except that no polymer mesh was used in forming the separator to give a freestanding 30 micron thick separator gel layer. The separator was difficult to handle due to a tendency to rupture.

Comparative Separator 2

For the purpose of comparison, a separator was formed as described in Separator Example 1 except that no polymer mesh was used in forming the separator to give a freestanding separator gel layer, and LiTFSI was used in place of BMP-TFSI to give a 30 micron thick separator. The separator was difficult to handle due to a tendency to rupture, which was exacerbated by a higher stickiness of this separator as compared to Comparative Separator 1.

Figure 2A:
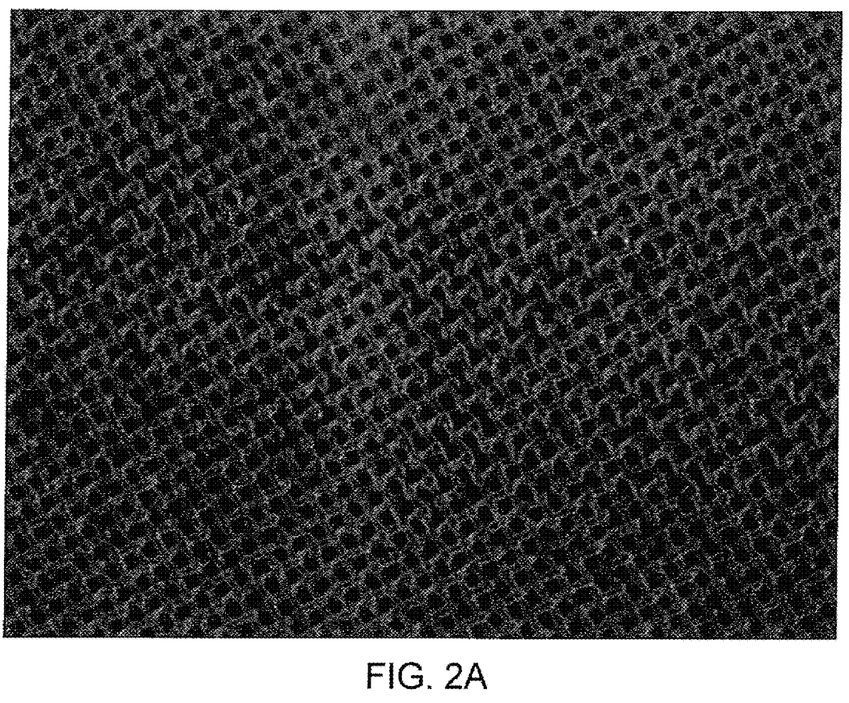
FIG. 2A is a light microscope image of a separator, according to some embodiments of the present disclosure, comprising a nylon mesh with a pore size of about 41 microns.
Figure 2B:
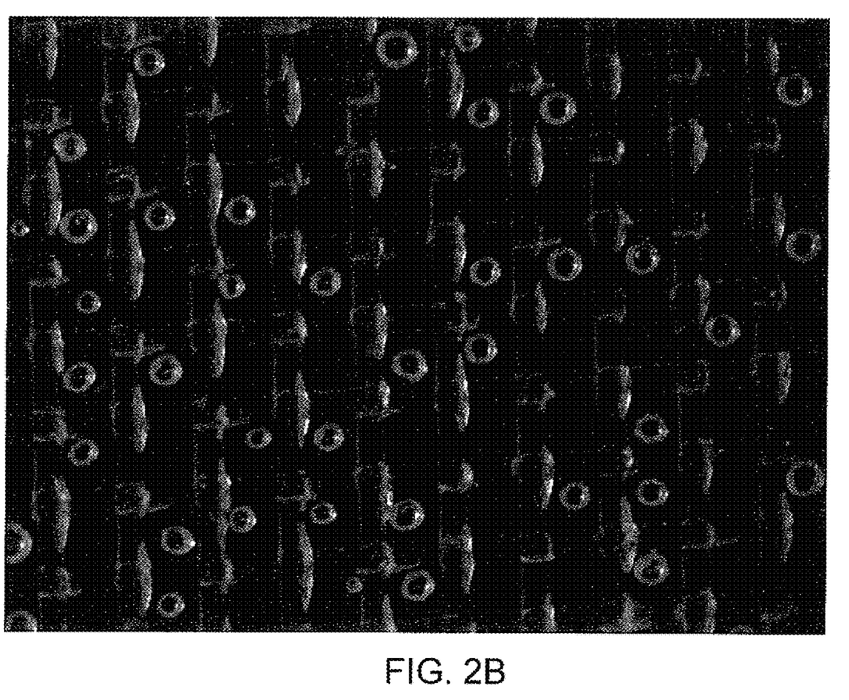
FIG. 2B is a light microscope image of a separator, according to according to some embodiments of the present disclosure, comprising a nylon mesh with a pore size of about 180 microns.

FIGS. 2A and 2B are light microscope images of Separator Examples 1 and 2 respectively. The gel is distributed homogenously in Separator Example 1, but air bubbles are observed in the larger mesh of Separator Example 2.

Figure 3:
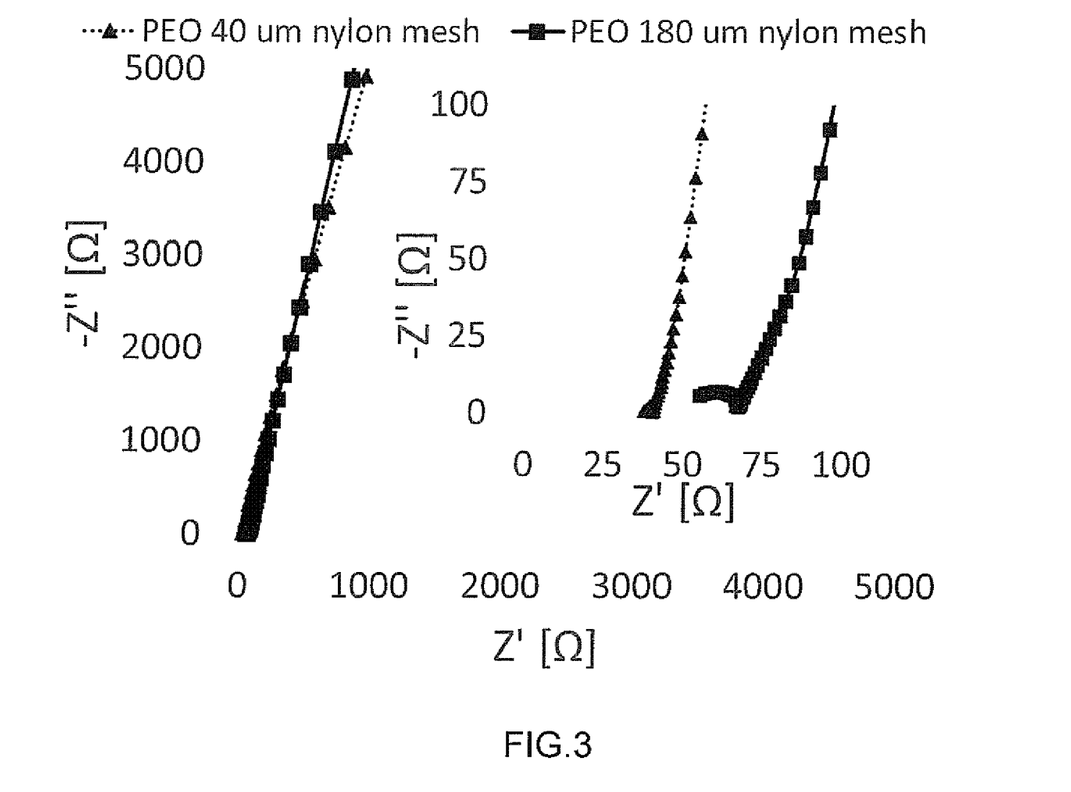
FIG. 3 shows Nyquist plots for the separators illustrated in FIGS. 2A and 2B.

With reference to FIG. 3, higher impedance is observed in EIS for Separator Example 2 as compared to Separator Example 1.

Figure 4:
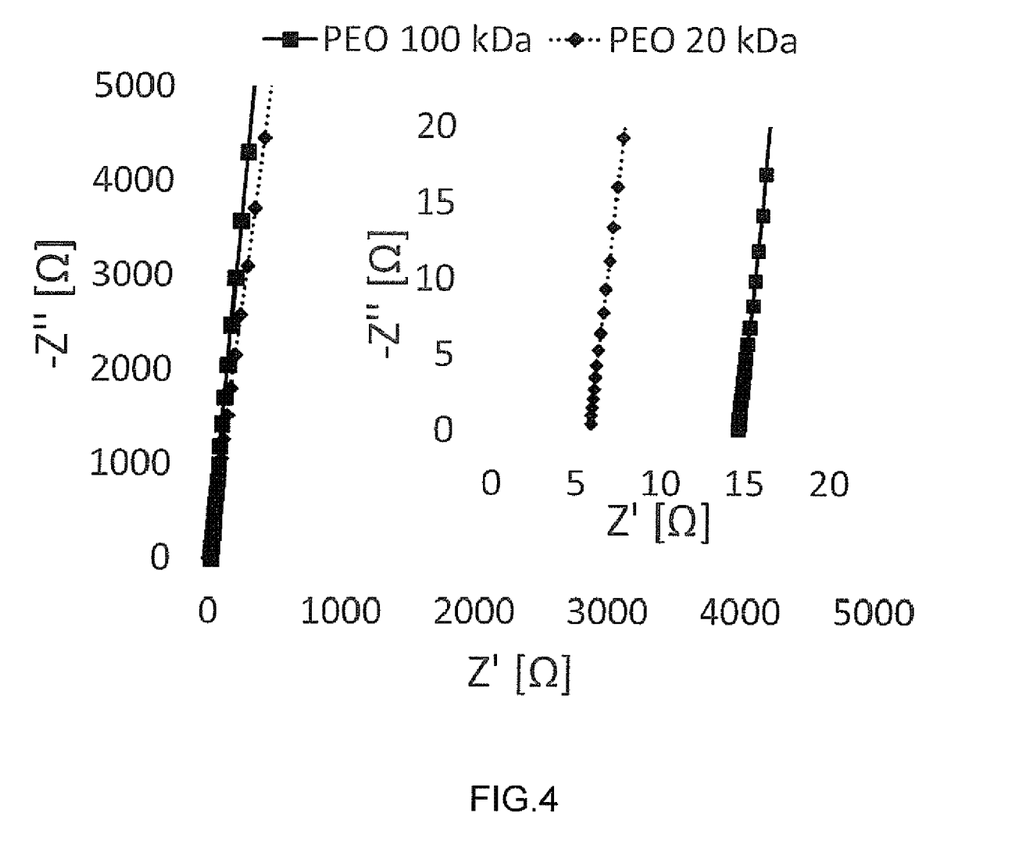
FIG. 4 shows Nyquist plots for separators, according to some embodiments of the present disclosure, containing crosslinked polyethylene oxide (PEO) formed from 100,000 Da and 20,000 Da PEO.

With reference to FIG. 4, higher impedance is observed for Separator Example 4, containing a higher molecular weight of PEO, than for Separator Example 1

An attempt to fabricate a battery with a separator containing the lower molecular weight, lower impedance gel of Separator Example 3 without a mesh was unsuccessful due to softness and susceptibility to damage of this separator in the absence of the mesh.

Figure 5:
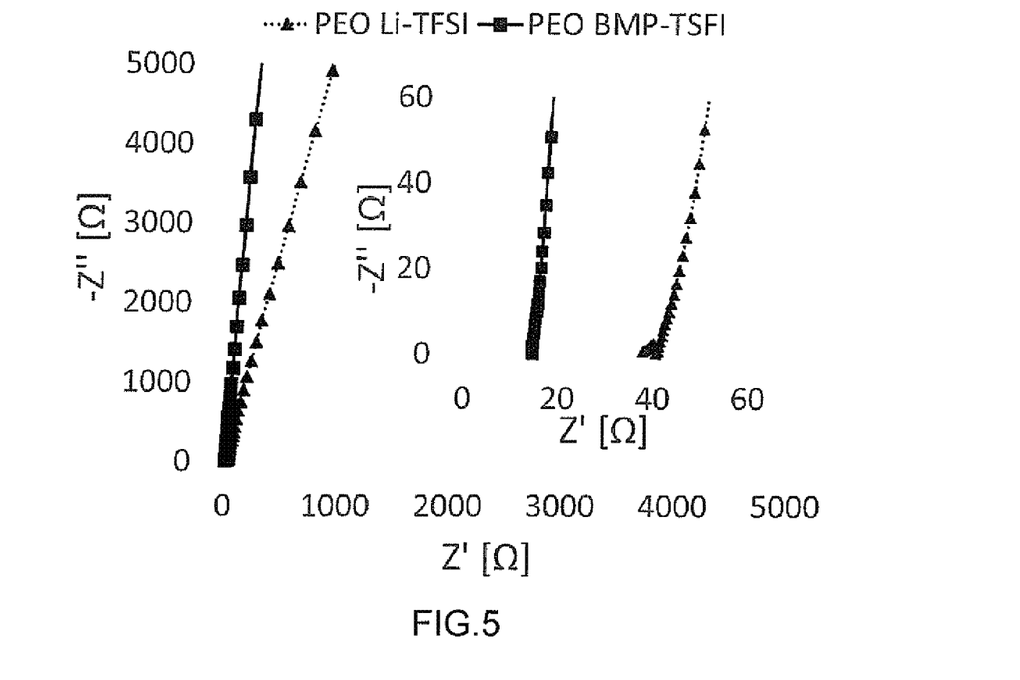
FIG. 5 shows Nyquist plots for separators containing Li-TFSI and BMP-TFSI, according to some embodiments of the present disclosure.

With reference to FIG. 5, use of Li-TFSI in Separator Example 5 results in a higher impedance than Separator Example 1 containing BMP-TFSI.

Separator Example 6

A separator was prepared as described for Separator Example 1 except that ionic liquid BMP-TFSI was included in the molten polymer mixture which is brought into contact with the nylon mesh, thereby eliminating the separate step of soaking the resultant composite in liquid electrolyte and enabling greater control over the amount of liquid electrolyte within the composite.

To form the molten mixture containing BMP-TFSI a molten mixture of PEO (100 k), PEO (20 k), tetraglyme, MBP and ionic liquid BMP-TFSI in a 3:1:4:0.8:11.2 weight ratio was prepared by mixing 0.25 g of PEO (20 k), 1.0 mL of tetraglyme, 0.21 g of MBP and 2.0 mL of BMP-TFSI per gram of PEO in a pestle and mortar at 120° C. until the PEO (20 k) fully melted and a viscous liquid formed. 0.75 g of PEO (100 k) was added, and the mixture was stirred until the PEO (100 k) fully melted and highly viscous paste formed.

Figure 6:
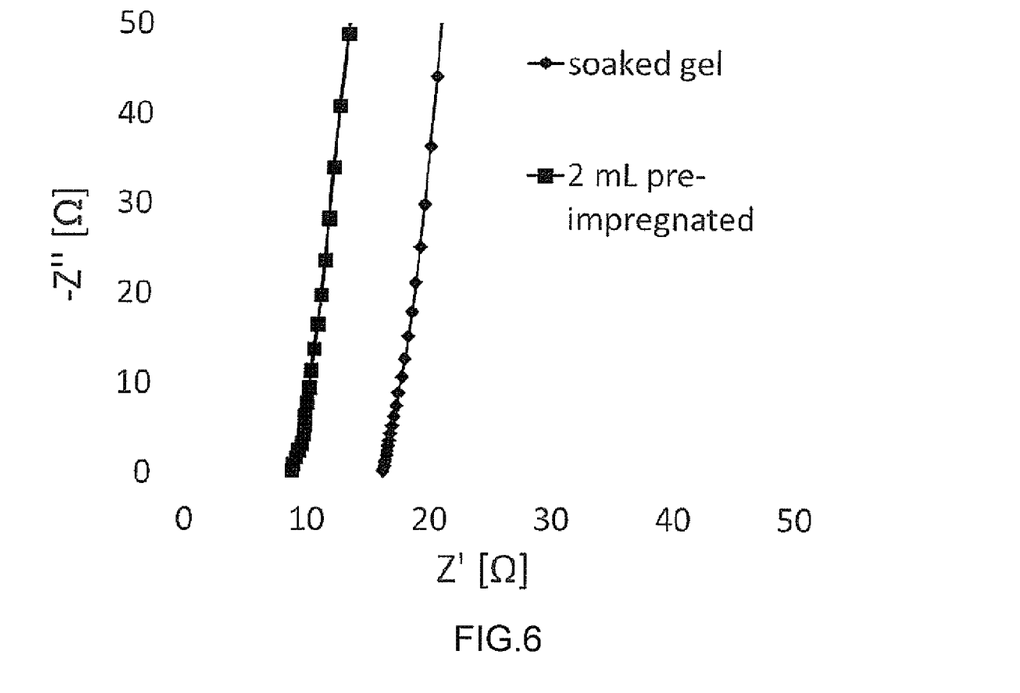
FIG. 6 shows Nyquist plots for a separator in which ionic liquid is absorbed into a composite structure, according to some embodiments of the present disclosure, after formation of the structure and in which ionic liquid is present in a melt used to form the ionic structure.

With reference to FIG. 6 Separator Example 6, in which the ion-conducting polymer is pre-impregnated with electrolyte, has higher conductivity than Separator Example 1 in which the ion-conducting polymer is absorbed into the ion-conducting polymer after formation of a gel/mesh composite.

Separator Example 7-9

Separators were prepared as described for Separator Example 6 except that the polymer melt was formed without BMP-TFSI which was then added to the polymer melt in the amounts of 0.2 mL/g of PEO, 1.0 mL/g and 2.0 mL/g. These melts were used to form Separator Examples 7, 8 and 9 respectively.

Figure 7:
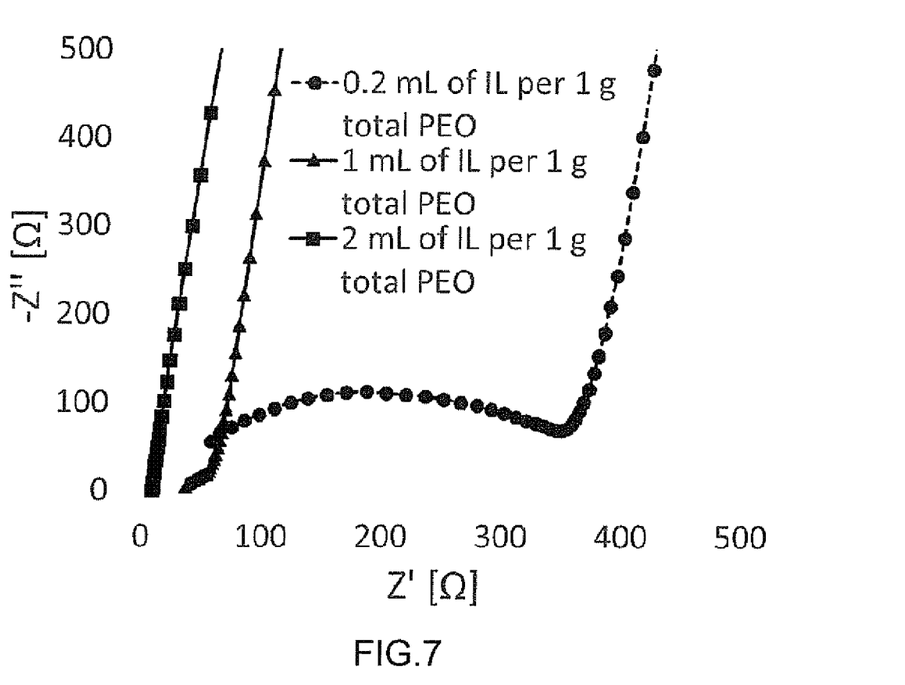
FIG. 7 shows Nyquist plots for separators, according to some embodiments of the present disclosure, containing 0.2 mL/g, 1 mL/g and 2 mL/g of ionic liquid.

With reference to FIG. 7, higher conductivity is achieved for a larger amount of ionic liquid in the separator.

Battery Example 1

A battery having the following structure was formed:
Glass/Al/anode/separator/cathode/Al/Glass

Two one-inch Al (150 nm) slides were pressed together side by side and 2 layers of transparent 3M tape (2×50 μm thick) were put on each side to define a 3 cm² area (2.5×1.2 cm). An anode formulation was evenly spread using scalpel blade onto ITO of one of the slides and a cathode formulation was spread onto ITO of the other slide. The tapes were peeled off and the electroactive layers were dried on a hotplate at 100° C. for 10 minutes.

The composite electrodes on Al were dehydrated at 150° C. for 20 minutes on a hotplate in a glovebox. Thereafter, Separator Example 1 was applied between the composite electrodes and metal clips were used to press the assembly together.

The anode formulation consisted of n-type polymer P1: Super P® Carbon Black: BMP-TFSI in a weight ratio of 1.0:0.8:0.2 mixed to a paste with o-dichlorobenzene.

The anode formulation consisted of p-type polymer P2: Super P® Carbon. Black: BMP-TFSI in a weight ratio of 1.0:0.8:0.2 mixed to a paste with o-dichlorobenzene.

n-type polymer P1 is an AB copolymer of formula p-type polymer P2 is an AB copolymer of formula:

Polymer P2 has a HOMO of −5.2 eV and a LUMO of −2.0 eV.

Figure 8:
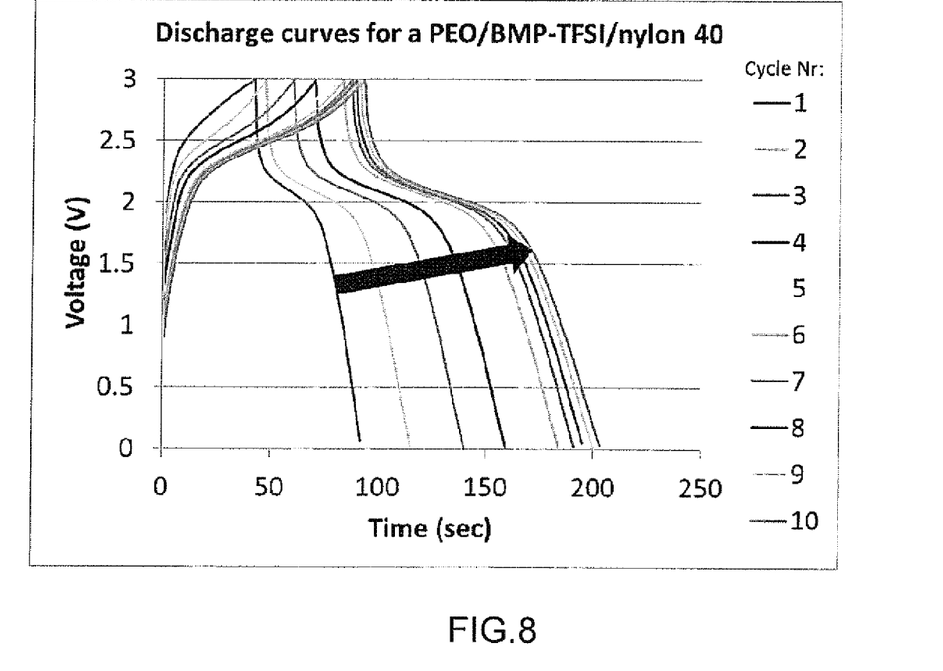
FIG. 8 shows discharge curves for a battery cell according to some embodiments of the present disclosure.

Discharge curves for Battery Example 1 are shown in FIG. 8, in which the arrow indicates an increasing number of cycles.

Effect of Electrolyte

Separators were prepared as described for Separator Example 1 except that filter paper was used as the separator and either BMP-TFSI or Li-TFSI was used as the electrolyte. Batteries containing these separators were prepared according to the method of Battery Example 1.

Figure 9:
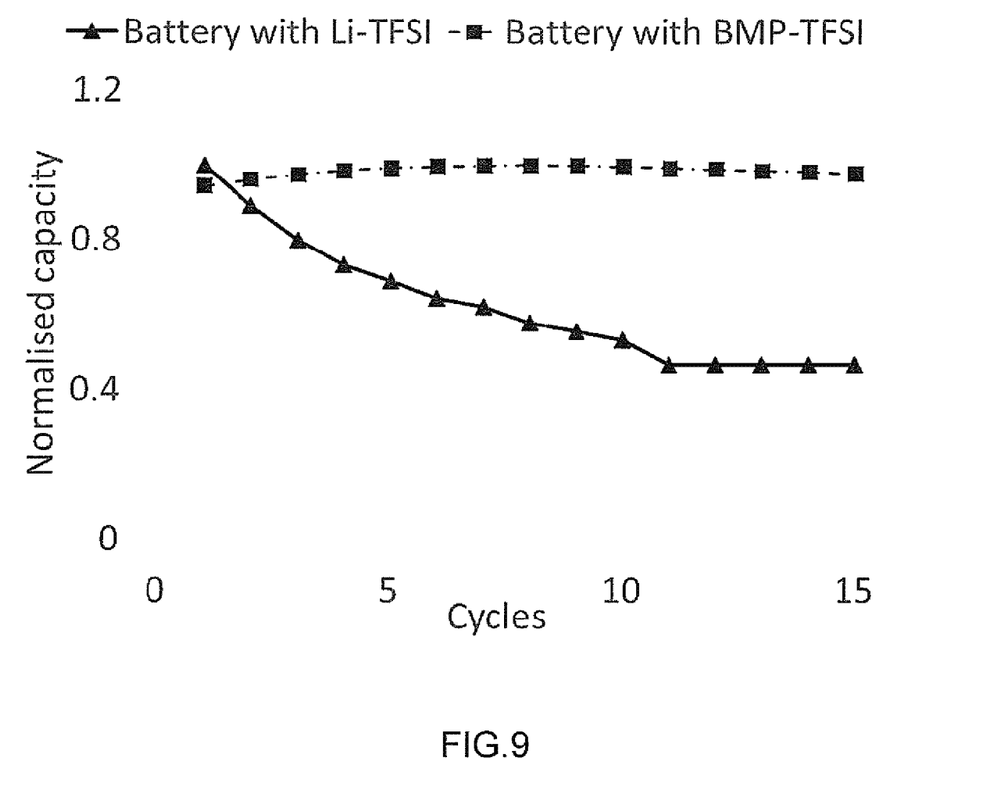
FIG. 9 shows normalised capacity versus cycles for battery cells containing containing Li-TFSI and BMP-TFSI, in accordance with some embodiments of the present disclosure.

With reference to FIG. 9, the capacity of the device containing Li-TFSI falls rapidly with cycling unlike the capacity of the device containing BMP-TFSI.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A method of forming a battery separator comprising a polymer mesh having mesh pores, and a gel disposed in the mesh pores, wherein the gel comprises a crosslinked ion-conducting polymer and an ionic liquid; the method comprising:
   introducing the ion-conducting polymer into the mesh pores by pressing the ion-conducting polymer against the polymeric mesh; and
   crosslinking the ion-conducting polymer.

2. The method of claim 1, wherein the ionic liquid is mixed with the ion conducting polymer before crosslinking thereof.

3. The method of claim 1, wherein the ion-conducting polymer is in a molten state or in a solution when introduced into the mesh pores.

4. The method of claim 1, wherein the ion-conducting polymer comprises polyethylene oxide.

5. The method of claim 1, wherein the polymeric mesh comprises a nylon mesh.

6. The method of claim 1, wherein the polymer mesh is woven.

7. The method of claim 1, wherein the ionic liquid comprises a sulfonimide.

8. The method of claim 1, wherein the gel comprises a plasticiser.

9. The method of claim 8, wherein the plasticiser comprises a glyme.

10. The method of claim 1, wherein the crosslinked ion conducting polymer comprises a crosslinked mixture of two or more ion-conducting polymers of differing molecular weights.

11. The method of claim 1, wherein the gel comprises a polymer gel electrolyte, and wherein the polymer gel electrolyte comprises a gel loaded with an ionic liquid.

12. The method of claim 1, wherein the crosslinked ion-conducting polymer comprises a crosslinked polymer having a weight average molecular weight of less than $1 \times 10^5$ Da.

13. A method of forming a battery separator comprising a polymer mesh having mesh pores, and a gel disposed in the mesh pores, wherein the gel comprises a crosslinked ion-conducting polymer and an ionic liquid; the method comprising:

introducing the ion-conducting polymer into the mesh pores; and crosslinking the ion-conducting polymer, wherein the ionic liquid is mixed with the ion conducting polymer before crosslinking thereof.

* * * * *